United States Patent
Takaichi et al.

(10) Patent No.: US 6,630,186 B1
(45) Date of Patent: Oct. 7, 2003

(54) DRINKS CONTAINING COCHINEAL COLORANT AND METHOD OF PREVENTING DISCOLORATION THEREOF

(75) Inventors: Akihisa Takaichi, Naruto (JP); Toshihiko Okamoto, Tokushima (JP); Tomoo Yamada, Tokushima (JP); Ryuichi Hatai, Tokushima (JP); Takashi Sato, Tokushima (JP)

(73) Assignee: Otsuka Pharmaceutical Co., Ltd., Tokyo (JP)

( * ) Notice: Subject to any disclaimer, the term of this patent is extended or adjusted under 35 U.S.C. 154(b) by 205 days.

(21) Appl. No.: 09/806,923
(22) PCT Filed: Aug. 2, 2000
(86) PCT No.: PCT/JP00/05169

§ 371 (c)(1),
(2), (4) Date: Apr. 6, 2001

(87) PCT Pub. No.: WO01/10249

PCT Pub. Date: Feb. 15, 2001

(30) Foreign Application Priority Data

Aug. 6, 1999 (JP) ............................................ 11-223907

(51) Int. Cl.7 ................................................. A23L 2/58
(52) U.S. Cl. .................... 426/250; 426/262; 426/330.3; 426/330.5; 426/540
(58) Field of Search ................................ 426/262, 250, 426/330.3, 330.5, 540

(56) References Cited

U.S. PATENT DOCUMENTS

| | | | | |
|---|---|---|---|---|
| 5,336,510 A | * | 8/1994 | Chang | 426/72 |
| 6,251,457 B1 | * | 6/2001 | Takaichi et al. | 426/321 |
| 6,287,611 B1 | * | 9/2001 | Morello et al. | 426/72 |
| 6,379,729 B1 | * | 4/2002 | Onishi et al. | 426/250 |
| 6,479,083 B1 | * | 11/2002 | Han et al. | 426/46 |

FOREIGN PATENT DOCUMENTS

| | | | |
|---|---|---|---|
| EP | 1 183 954 A1 | * | 3/2002 |
| JP | 07-059559 | | 3/1995 |
| JP | 409299094 A | * | 11/1997 |
| JP | 62-278961 | | 12/1997 |
| JP | 2000-336354 | | 12/2000 |

OTHER PUBLICATIONS

"Cochineal as a colorant in processed pork meat. Colour matching and oxidative stability . . . " Helle Lindberg Madsen et al., Food Chemistry (1993) vol. 46, No. 3, p. 265–271.

* cited by examiner

*Primary Examiner*—Nina Bhat
(74) *Attorney, Agent, or Firm*—Finnegan, Henderson, Farabow, Garrett & Dunner LLP

(57) ABSTRACT

The present invention provides a cochineal pigment-containing beverage comprising nigerooligosaccharide and an anti-fading method for a cochineal pigment-containing beverage comprising adding thereto nigerooligosaccharide.

8 Claims, No Drawings

DRINKS CONTAINING COCHINEAL COLORANT AND METHOD OF PREVENTING DISCOLORATION THEREOF

This application claims benefit under 35 U.S.C. 371 of PCT/JP00/05169, filed Aug. 2, 2000.

TECHNICAL FIELD

This invention relates to an anti-fading method for a beverage colored with a cochineal pigment and to a cochineal pigment-containing beverage prevented from losing colors.

BACKGROUND ART

Various pigments have conventionally been used to enhance the preference of foods and drinks and especially consumer needs for natural pigments are recently on the rise. Among the natural pigments, berry color, red cabbage color, grape skin color and like anthocyanin pigments providing orange-to-red color have been conventionally and widely used as food colorants. However, the anthocyanin pigments have serious defects to fade or discolor when exposed to light rays. In contrast, cochineal pigments, also providing orange-to-red colors (under acidic conditions), are known to be excellent especially in light resistance among the natural pigments and widely used for coloring foods and drinks showing acidity.

However, even the above cochineal pigment is not satisfactory in light resistance and gradually fades with prolonged exposure to light. Further, recently clear colorless glass and PET bottles are preferred as containers. Foods and drinks packed in such containers are often exhibited for sale under harsh conditions as exposed to light for 24 hours, for example, at convenience stores, so that complaints against discolored products are increasing. In view of these situations, development of a new agent or a new method is strongly desired in the related industrial areas for preventing fading or discoloring of the natural pigments.

Accordingly, an object of the present invention is to provide a novel anti-fading agent capable of preventing a cochineal pigment from fading, an anti-fading method for a cochineal pigment-containing beverage, and a cochineal pigment-containing beverage protected from discoloration.

The inventors have conducted extensive researches to achieve the above object and found that a certain type of sugar existing in the well-known and widely-used food material of carbohydrate is effective in preventing fading of a cochineal pigment caused by exposure to light, to thereby accomplish the present invention.

DISCLOSURE OF INVENTION

The present invention provides a cochineal pigment-containing beverage comprising nigerooligosaccharide.

Beverages of the invention include a beverage comprising 0.02 to 10.8 g of nigerooligosaccharide per mg of cochineal pigment; a beverage comprising 1 to 20 mg of cochineal pigment and 1 to 15 g of a syrup containing 40 to 72% by weight of nigerooligosaccharide per 100 ml of the beverage; and beverages containing the above components in which pH is adjusted to 5 or below and which additionally comprise vitamin C and dietary fibers.

Further, the present invention provides an anti-fading method for cochineal pigment-containing beverage comprising incorporating nigerooligosaccharide, in more detail, an anti-fading method for a beverage comprising adding 0.02 to 10.8 g of nigerooligosaccharide per mg of cochineal pigment; an anti-fading method for a beverage comprising incorporating 1 to 20 mg of cochineal pigment and 1 to 15 g of syrup containing 40 to 72% by weight of nigerooligosaccharide per 100 ml of the beverage; and an anti-fading method for beverages comprising adjusting the pH of beverage to 5 or below and incorporating vitamin C and dietary fibers in addition to the above ingredients.

By addition of nigerooligosaccharide, the cochineal pigment-containing beverage of the invention can be effectively protected for a long time from fading of the cochineal pigment caused by exposure to light. As seen from the examples given below, for example, a cochineal pigment-containing beverage fades and becomes almost transparent and colorless when exposed to 20,000 lux(Lx) fluorescent light for about three weeks, while a cochineal pigment-containing beverage comprising nigerooligosaccharide in about seven-hundredfold parts by weight per one part weight of cochineal pigment exhibits such an excellent anti-fading effect that the beverage does not substantially discolor after about two months under the same conditions.

The beverages of the invention as hereinafter explained in detail, are not limited and may be any known type containing a cochineal pigment. The beverages encompass any type of soft drinks including fruit juices, carbonated beverages, etc. The beverages are preferably bottled in light permeable containers such as clear glass bottles, clear colorless PET bottles and the like.

A beverage according to a preferable embodiment of the present invention contains the following ingredients in the total amount of 100 ml.

| Ingredient | Amount |
|---|---|
| Nigerooligosaccharide-containing syrup | 1–15 g |
| Cochineal Pigment | 1-20 mg |
| Saccharide | 1-20 g |
| Dietary Fibers | 10 g or less |
| Sour agent | 0.1–2 g |
| Flavoring agent | proper quantity |
| Fruit juices | proper quantity |
| Vitamins | proper quantity |
| Minerals | proper quantity |
| Amino-acids | proper quantity |
| High-intensity sweetener | proper quantity |

Examples of the high-intensity sweetener include stevia (stevioside), suclarose or the like.

The general term "cochineal pigment" is used herein to mean a class of pigments comprising carminic acid as an active ingredient and may be any pigment used as coloring agent in the field of drugs or foods. The cochineal pigment may be used in the invention in commercially available forms, such as powder, solution, etc. Examples of commercially available products include "SAN RED No.1" (San-Ei Gen F.F.I.,Inc), "RED NY-C" (Japan Chlorophyll Co.,Ltd), "kidrenin" (Tokyo Tanabe Seiyaku Co., Ltd.), "DAIICHI COLOR RED RC" (Daiichi Kasei Co.,Ltd), "RED COLOR TH-C" (T. Hasegawa Co., Ltd), etc.

The cochineal pigment-containing beverage of the present invention contains the cochineal pigment preferably in an amount of 1 to 20 mg, more preferably in an amount of about 1 to about 2 mg per 100 ml of the beverage.

According to the invention, it is essential to incorporate nigerooligosaccharide into the beverage. The general term "nigerooligosaccharide" is used herein to mean oligosaccharides with a degree of glucose polymerization of 2 or more and containing at least one alpha-1, 3-glucosidic linkage. Nigeroologosaccharides preferably are oligosaccharides with a degree of glucose polymerization of 2 to 10, and more preferably are oligosaccharides with a degree of glucose polymerization of 2 to 7. Examples of such nigerooligosaccharides are nigerose, nigerosylglucose, nigerosylmaltose and the like. The nigerooligosaccharide as an anti-fading agent in the present invention includes oligosaccharides having only alpha-1, 3-glucosidic linkages as well as oligosaccharides having alpha-1, 3-glucosidic linkages and other glucosidic linkages (for example, alpha-1, 1-, alpha-1, 2-, alpha-1, 4-, and alpha-1, 6-glucosidic linkages).

Nigerooligosaccharide can be produced by any method. For example, it can be prepared by the known method (for example, M. Stacey and J. M. Webber: Methods in Carbohydrate Chemistry, I, pp.339–341, Academic press 1962). More specifically, the method comprises the step of hydrolysing a microorganisms-produced polysaccharide such as nigeran, erucinan and the like as a substrate by using an enzyme or an acid. Another method is known which employs the known transglycosylation and/or condensation reaction of alpha-glucosidase to produce nigerose (see Kenichi Kaneya et al., The Society of Japan Agricultural Chemistry, 53, pp. 385–390, 1979; H. Fujimoto et al., Agric. Biol. Chem., 52, pp. 1345–1351, 1988; etc.). Unexamined Japanese Patent Publication No. H03-22958 discloses another method, wherein a cyclodextrin glucanotransferase is used to act on a starch hydrolyzate to produce nigerose. Further, another method is disclosed (Unexamined Japanese Patent Publication No. H07-59559), wherein at least one of glycosyltransferases providing alpha-1, 3-linkage, specifically, a glycosyltransferase which is obtained by conventionally culturing fungi which belongs to the genus Acremonium and produces a glycosyltransferase providing alpha-1, 3-linkage, for example, Acremonium sp. S4G13 (FERM BP-4373), is allowed to act on a substrate containing an alpha-1, 4-glucoside-linked polysaccharide or oligosaccharide to produce nigerooligosaccharide.

The nigerooligosaccharide used in the invention as an anti-fading agent for a cochineal pigment can be prepared by any method selected from those mentioned above. However, the method using glycosyltransferase (nigerooligosaccharide glucanotransferase) disclosed in Unexamined Japanese Patent Publication No. H07-59559 is considered the most economical among known methods. Therefore, the nigerooligosaccharide prepared by this method is preferably used in the invention.

The cochineal pigment-containing beverage of the present invention contains nigerooligosaccharide as essential ingredient and may contain various optional ingredients producing no adverse effect on the anti-fading action. The saccharides (syrup) prepared by the method mentioned above may contain monosaccharides like glucose, oligosaccharides comprised of other glucosidic linkages than alpha-1, 3-glucosidic linkage (such as maltose), dextrin, and the like, in addition to an oligosaccharide (nigerooligosaccharide) with a degree of glucose polymerization of 2 or more which contains at least one alpha-1, 3-glucosidic linkage, such as nigerose, nigerosylglucose, nigerosylmaltose and the like. Such syrup as containing nigerooligosaccharide and any other ingredients is usable in the invention as it is. Nigerooligosaccharide consisting only of nigerose is usable. Nigerooligosaccharide used as an anti-fading agent in the present invention may be in the form of a mixture of nigerooligosaccharides with different degrees of glucose polymerization, and if necessary, it may be a single nigerooligosaccharide with a required degree of glucose polymerization separated by the method such as chromatographic fractionation. The anti-fading agent may be in the form of syrup obtained by the above-mentioned methods or in any other form such as freeze-dried powders, powders, granules, etc.

In producing the beverage of the invention, nigerooligosaccharide may be incorporated together with the ingredients of the base beverage or may be added after producing the base beverage, so that these components may coexist with a cochineal pigment in the resultant beverage.

The amount of nigerooligosaccharide to be included in the beverage of the invention may basically be such an amount capable of achieving anti-fading effect, and is suitably determined depending on the type and amount of the ingredients contained in the beverage, especially the type and amount of cochineal pigment, the type of the beverage, etc. Usually, the amount of nigerooligosaccharide is in the range of 0.02 to 10.8 g, preferably in the range of about 0.5 to about 2.0 g per 1 mg of cochineal pigment. The above amount of nigerooligosaccharide corresponds to about 1 to about 15 g, preferably about 1.2 to about 4.5 g of the syrup containing 40 to 72% by weight of nigerooligosaccharide per 100 ml of the beverage.

Beverages of the present invention may be adjusted to pH 5 or below and may contain vitamin C and dietary fibers in specified amounts. The pH can be adjusted, for example, by adding a sour agent such as citric acid, etc. Since cochineal pigments are known to have higher stability and show better color tone under acidic condition than other pigments and widely used under the acidic condition. Soft drinks are usually acidic and therefore the invention can favorably be applicable to acidic drinks.

Conventionally, it is considered care must be taken when vitamin C and dietary fibers are added to a cochineal pigment-containing beverage because both of them generally tend to promote fading of a cochineal pigment. However, according to the present invention, these ingredients can be safely included in the beverage due to the excellent fading-preventive action of nigerooligosaccharide.

Any known dietary fibers generally added to this type of beverage, such as polydextrose, pinefiber and the like are usable.

The amounts of vitamin C and the dietary fibers may generally be, per 100 ml of the beverage, up to about 1 g and up to about 10 g, respectively.

According to the invention, the desired cochineal pigment-containing beverages can be obtained, which are remarkably prevented or protected from fading of a cochineal pigment conventionally caused by exposure to light. These beverages have good appearance of reddish orange tone and have good taste. Further, the vitamin C and dietary fiber-containing beverage of the invention is beneficial from the viewpoint of dietetics.

BEST MODE FOR CARRYING OUT THE INVENTION

The following examples are given to illustrate the present invention. Examples 1–3

Cochineal pigment-containing beverages of the present invention were prepared, using nigerooligosaccharide-containing syrup (trade name: Taste Oligo, product of Nihon Shokuhin Kako Co., Ltd., nigerooligosaccharide content: 43.5% by weight, solid content: 73% by weight) and other ingredients given in Table 1 below. Table 1 shows also a composition of comparative cochineal pigment-containing beverage that does not contain nigerooligosaccharide-containing syrup.

TABLE 1

| Ingredients (/100 ml) | Example 1 | Example 2 | Example 3 | Comp. Example |
|---|---|---|---|---|
| Nigerooligo-saccharide-containing Syrup (g) | 1.4 | 2.8 | 4.3 | 0 (No addition) |
| Sugar (g) | 5.8 | 5.1 | 4.5 | 6.4 |
| Liquid sugar (g) | 5 | 5 | 5 | 5 |
| Dietary Fiber (g) | 7 | 7 | 7 | 7 |
| Sour agent (g) | small quantity | small quantity | small quantity | small quantity |
| Vitamin C (mg) | 300 | 300 | 300 | 300 |
| Cochineal Pigment (mg) | 1.68 | 1.68 | 1.68 | 1.68 |

Polydextrose was used as "dietary fiber" in all beverages shown in Table 1, and each beverage had a pH of 3.

Experiment 1

Each of clear colorless glass bottles (capacity: 100 ml) was filled with each of the cochineal pigment-containing beverages of the invention prepared in Examples 1–3 and the comparative beverage to make test samples. A set of these test samples was exposed to sunlight (in a small room having a glass window on the south side) and another set of these samples was exposed to a fluorescent light (Growth Cabinet MLR-350, SANYO Electric Co., Ltd, illumination: 20,000 Lux), and the discoloration of bottled beverages with time was observed.

The degrees of fading were evaluated by measuring the absorbance at a maximum absorption of 490 nm of cochineal pigment and calculating the color persistency (%) using the absorbance (reference) at the time of starting the test (at the time of starting the irradiation with sunlight or fluorescent light) and the absorbance after prescribed time.

The degrees of fading were evaluated by measuring the absorbance at a maximum absorption of 490 nm of cochineal pigment and calculating the color persistency (%) according to the following equation, using the absorbance (reference) at the time of starting the test (at the time of starting the irradiation with sunlight or fluorescent light) and the absorbance after prescribed time.

Results are shown in Table 2 (sunlight irradiation) and in Table 3 (fluorescent light irradiation). The time of exposure to sunlight in these test is expressed in solar radiation unit ($MJ/m^2$) which was determined by Solar Cell Actinometer SA-T-300 (Suga Test Instruments Co., Ltd.). Usually, solar radiation per sunny midsummer day is estimated to be at about 20 $MJ/m^2$.

TABLE 2

| persistency (%) | Example 1 | Example 2 | Example 3 | Comp. Example |
|---|---|---|---|---|
| at the time of starting the test | 100.0 | 100.0 | 100.0 | 100.0 |
| at 90 $MJ/m^2$ | 91.63 | 94.70 | 94.23 | 82.68 |
| at 370 $MJ/m^2$ | 58.25 | 87.53 | 90.90 | 34.59 |
| at 740 $MJ/m^2$ | 25.48 | 47.49 | 75.81 | 22.53 |

TABLE 3

| persistency (%) | Example 1 | Example 2 | Example 3 | Comp. Example |
|---|---|---|---|---|
| at the time of starting the test | 100.0 | 100.0 | 100.0 | 100.0 |
| after 1 week | 95.28 | 95.55 | 97.66 | 91.53 |
| after 2 weeks | 90.04 | 95.92 | 96.91 | 48.04 |
| after 3 weeks | 84.43 | 93.39 | 95.17 | 35.34 |

As is apparent from Table 2 and Table 3, the cochineal pigment-containing beverage of the present invention is effectively inhibited from fading caused by exposure to light in relation to the concentration of nigerooligosaccharide.

What is claimed is:

1. A cochineal pigment-containing beverage comprising a cochineal pigment containing beverage and a nigerooligosaccharide.

2. A beverage according to claim 1, which contains 0.02 to 10.8 g of nigerooligosaccharide per mg of cochineal pigment.

3. A beverage according to claim 1, which contains 1 to 20 mg of cochineal pigment and 1 to 15 g of syrup containing 40 to 72% by weight of nigerooligosaccharide per 100 ml of the beverage.

4. A beverage according to any one of claims 1 to 3, which is adjusted to pH 5 or below and containing vitamin C and dietary fibers.

5. An anti-fading method for a cochineal pigment-containing beverage comprising adding to the cochineal pigment-containing beverage nigerooligosaccharide to prevent fading of the pigment in the beverage.

6. An anti-fading method for beverage according to claim 5, wherein nigerooligosaccharide is added in an amount of 0.02 to 10.8 g per mg of cochineal pigment.

7. An anti-fading method for beverage according to claim 5, wherein 1 to 20 mg of cochineal pigment and 1 to 15 g of syrup containing 40 to 72% by weight of nigerooligosaccharide are added per 100 ml of the beverage.

8. An anti-fading method for beverage according to any one of claims 5 to 7 wherein the pH of said beverage is adjusted to 5 or below and further adding vitamin C and dietary fibers.

* * * * *